March 16, 1954     H. HUEMER ET AL     2,672,398
PROCESS FOR THE PRODUCTION OF CYANOGEN CHLORIDE
Filed April 17, 1950
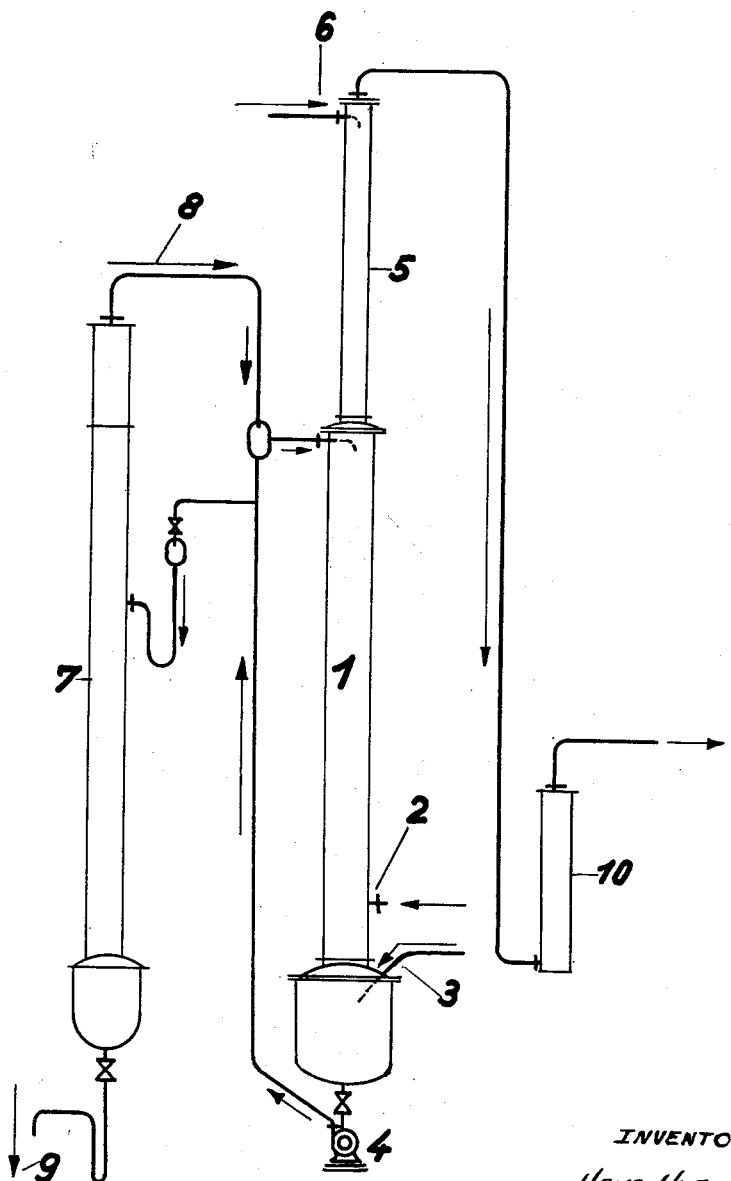
INVENTORS
HANS HUEMER
HERMANN SCHULZ
WALTER POHL
BY Bailey, Stephens & Huettig
                     ATTORNEYS Patented Mar. 16, 1954

2,672,398

UNITED STATES PATENT OFFICE 2,672,398

PROCESS FOR THE PRODUCTION OF CYANOGEN CHLORIDE

Hans Huemer and Hermann Schulz, Konstanz Baden, and Walter Pohl, Frankfurt am Main, Germany, assignors to Deutsche Gold- und Silber-Scheideanstalt vormals Roessler, Frankfurt am Main, Germany, a corporation of Germany Application April 17, 1950, Serial No. 156,302

Claims priority, application Germany December 12, 1949

6 Claims. (Cl. 23—14)

The present invention relates to the production of cyanogen chloride and particularly to an improved method of making the same.

It has been known in the art that cyanogen chloride may be produced by the action of chlorine on aqueous solutions of hydrocyanic acid. According to one of these processes the reaction between chlorine and aqueous hydrocyanic acid solutions may be continuously effected in a column whereby the chlorine gas is passed in countercurrent to the hydrocyanic acid solution trickling over a packing material.

This procedure, however, was very unsatisfactory because a reaction product was obtained which contained considerable quantities of hydrocyanic acid and hydrochloric acid besides free chlorine. The mixed gases were washed with aqueous suspensions of calcium carbonate and subsequently treated with activated carbon. In order to remove the impurities (see British Patent No. 601,701). The principal object of the present invention is to provide a method for the continuous production of cyanogen chloride in a state of high purity.

It has been found that pure cyanogen chloride may be prepared from aqueous hydrocyanic acid and chlorine without being contaminated with the aforementioned by-products if the reaction between chlorine and hydrocyanic acid is effected continuously in a column filled with packing material, whereby the aqueous solution of hydrocyanic acid circulates in a cycle process. The principle of this procedure lies in the fact that in comparison with the hitherto known methods the amount of liquid in countercurrent to the chlorine gas is ten times to thirty times as large as the fluid quantity used in former processes. The increase of the amount of liquid is caused by the circulation process.

Although the concentration of the circulating hydrocyanic acid in the aqueous solution was low the chlorine was completely used up. The cyanogen chloride passing off at the top of the column contains no traces of free chlorine. It is a further advantage of the present invention that owing to the chlorination with low concentrations of hydrocyanic acid the hydrocyanic acid may be washed with water to such a degree that the cyanogen chloride thus formed is practically free from hydrocyanic acid.

The present invention provides therefore a very simple method for the continuous production of cyanogen chloride in a state of high purity in a single system without practicing complicated additional chemical or absorption methods as proposed in prior processes.

The state of purity of the cyanogen chloride thus formed is a characteristic feature in the trimerization process for the production of cyanuric chloride in the gas phase.

In order to describe the present invention more fully the following example is given, it being understood that the invention is not limited to this specific illustration. In the accompanying drawing constituting a part thereof, the single figure is a cross-sectional view of an apparatus adapted to the practice of the present invention. At the base of the reaction column or tower 1 which is filled with packing material; 6.75 kg./per hour of hydrocyanic acid are admitted to the inlet 2. In the column a weak HCN solution is circulating whereby the concentration of HCN is kept at a constant level by a reaction conversion with chlorine introduced at the base of the column 3. By means of a centrifugal pump 4 a quantity of liquid of 3 to 4 cbm./per hour is circulating in a cycle process from the base to the top of the column. Above the chlorination column 1 an auxiliary column or tower 5 is provided with a flow of 300 liters/per hour of water washed down through the opening 6 into the reaction column 1. The reaction heat is carried off by means of cooling devices. The temperature inside of the circulation column is therefore kept at about 40° C.

The major part of the cyanogen chloride thus formed escapes in a state of high purity through the superimposed wash column whilst a small part of the cyanogen chloride together with dilute HCN is transferred from the cycle process to a denaturation column 7. From this column 7 the volatile parts of the mixture, i. e. cyanogen chloride and HCN, are reconducted over line 8 to the top of the principal column 1 whilst the dilute HCl is sucked off at the outlet 9.

To provide a practically complete purification of the cyanogen chloride thus formed it is only necessary to dry the cyanogen chloride gas coming from the wash tower in a drying tower 10. In the drying process non-alkaline drying media such as calcium chloride, silica gel and the like are utilized. After the drying process has been finished a quantity of 14.7 kgs./per hour of cyanogen chloride 100% may be recovered corresponding to a yield of 95.7% of the theoretical.

The present invention is not necessarily limited to the details enumerated above, since the method may be varied as will be apparent to those skilled in the art.

What we claim is:

1. In a process for the production of cyanogen chloride wherein an aqueous solution of hydrocyanic acid is passed downwardly through a chlorination column counter-current to chlorine introduced at the base of the column, washing the cyanogen chloride formed with water and introducing the wash water into the head of the column, the steps which comprise maintaining a cycle of dilute aqueous hydrocyanic acid passing downwardly through said column, introducing substantially equimolecular quantities of chlorine and fresh hydrocyanic acid into such cycle while it is passing through such column, the quantities of chlorine and hydrocyanic acid introduced being such that the concentration of the dilute hydrocyanic acid in the cycle remains substantially constant withdrawing a minor portion of the solution from the cycle outside of said column, volatilizing hydrocyanic acid and cyanogen chloride from such portion and reintroducing such volatilized hydrocyanic acid and cyanogen chloride into the cycle, maintaining a substantially constant temperature within said column and withdrawing the major portion of the cyanogen chloride formed from the cycle.

2. A process according to claim 1, wherein the fresh hydrocyanic acid is introduced into the lower portion of the column.

3. A process according to claim 1, in which the concentration of hydrocyanic acid in such cycle is maintained between 2% and 3%.

4. A process according to claim 1, wherein the temperature maintained in the column is about 40° C.

5. A process according to claim 1, comprising in addition drying the washed cyanogen chloride with a non-alkaline drying medium.

6. In a process for the production of cyanogen chloride wherein an aqueous solution of hydrocyanic acid is passed downwardly through a chlorination column counter-current to chlorine introduced at the base of the column, washing the cyanogen chloride formed with water and introducing the wash water into the head of the column, the steps which comprise maintaining a cycle of a 2% to 3% aqueous solution of hydrocyanic acid passing downwardly through said column, introducing substantially equimolecular quantities of chlorine and fresh hydrocyanic acid into such cycle while it is passing through such column, the quantities of chlorine and hydrocyanic acid introduced into such cycle being such that the concentration of the hydrocyanic acid in such cycle remains within the aforementioned range, withdrawing a portion of the solution from such cycle outside of said column corresponding to the amount of water introduced into such cycle, volatilizing hydrocyanic acid and cyanogen chloride from such portion to leave a dilute hydrochloric acid solution, reintroducing such volatilized hydrocyanic acid and cyanogen chloride into such cycle maintaining a substantially constant temperature within said column of about 40° C. and withdrawing the major portion of the cyanogen chloride formed from the cycle.

HANS HUEMER.
HERMANN SCHULZ.
WALTER POHL.

References Cited in the file of this patent

UNITED STATES PATENTS

| Number | Name | Date |
|---|---|---|
| 1,588,731 | Heuser | June 15, 1926 |
| 2,391,490 | Thurston et al. | Dec. 25, 1945 |
| 2,489,703 | Cook | Nov. 29, 1949 |
| 2,516,832 | Rosenbloom | July 25, 1950 |

FOREIGN PATENTS

| Number | Country | Date |
|---|---|---|
| 125,625 | Australia | Sept. 25, 1947 |